United States Patent [19]

Bell et al.

[11] 3,989,868

[45] Nov. 2, 1976

[54] TRANSMISSION BELTS

[75] Inventors: Richard Bell, Dumfries, Scotland; Takao Sato, Yamatokoriyama, Japan; Chitta R. Lahiri, Naugatuck; Thomas G. Carver, Woodbridge, both of Conn.

[73] Assignee: Uniroyal Limited, Newbridge, Scotland

[22] Filed: May 29, 1975

[21] Appl. No.: 582,031

[30] Foreign Application Priority Data

May 21, 1974 United Kingdom............... 24217/74

[52] U.S. Cl. .............................. 428/161; 74/231 C; 156/137; 260/79.3 R; 428/290; 428/292; 428/423; 428/441; 428/523
[51] Int. Cl.² ........................................... B32B 3/00
[58] Field of Search ........... 428/260, 268, 273, 295, 428/440, 492, 161, 290, 292, 423, 441, 523, 442, 522; 156/137, 138, 140; 260/79.3 R, 873, 42.18; 74/231 C, 232, 233, 234, 237

[56] References Cited

UNITED STATES PATENTS

| 2,723,257 | 11/1955 | McAlevy et al................ 260/79.3 R |
| 3,078,205 | 2/1963 | Sauer et al........................... 156/137 |
| 3,078,206 | 2/1963 | Skura................................... 156/140 |
| 3,122,934 | 3/1964 | Fihe..................................... 428/295 |
| 3,324,088 | 6/1967 | Waldron et al.................... 260/79.3 |
| 3,621,727 | 11/1971 | Cicognani............................. 74/237 |
| 3,835,720 | 9/1974 | Fisher et al. ..................... 74/231 C |

*Primary Examiner*—James J. Bell
*Attorney, Agent, or Firm*—Jay L. Chaskin

[57] ABSTRACT

A toothed power transmission belt comprising a body with transversely extending teeth along at least one of its faces and an inextensible tensile member embedded in said body, said body being made from a chlorosulphonated polyethylene compounded with not more than 15 parts by weight of acid acceptor per 100 parts by weight of chlorosulphonated polyethylene.

13 Claims, No Drawings

TRANSMISSION BELTS

This invention relates to toothed power transmission belts. There is known a power transmission belt having an inextensible tensile member having teeth bonded to one side and a backing layer on the other side, the teeth and backing layer constituting an integral body made of an elastomeric material.

Toothed power transmission belts are used extensively in the automotive industry. There is now intensive investigation into the problem of reducing pollution due to exhaust gases from internal combustion engines, and one approach to this is to design engines to run at a higher temperature than at present, to give substantially complete combustion of the fuel and to burn off residual exhaust gases. Conventional engines run at a temperature of about 75° to 90° C and it is proposed that high temperature engines should run at temperatures up to about 120° C. Existing toothed belts break down very rapidly as a result of working at temperatures around 120° C and the object of the invention is to provide a belt that will operate satisfactorily at such temperatures.

The present invention provides a toothed power transmission belt comprising a body with transversely extending teeth along at least one of its faces and an inextensible tensile member embedded in the body, the body being made from a chlorosulphonated polyethylene compounded with not more than 15 parts of acid acceptor per hundred parts of chlorosulphonated polyethylene.

Recommended levels of acid acceptor for chlorosulphonated polyethylene are about 25 pphr (parts per hundred rubber), and the amount used in the compound for belts according to the invention is very much lower than this. Acid acceptors are necessary to sweep up hydrochloric acid which is produced in situ in the compounded polymer due to the presence of the chloride atoms. Surprisingly, the use of the low levels of acid acceptor in belt compounds is found to delay the modulus development of the compound and slow down the rate of hardness increase of the belt during ageing at high temperatures. Thus, belts according to the invention can be made to have satisfactory life in service at temperatures up to about 120° C, and in tests belts have been run at this temperature for periods exceeding 500 hours without failure.

The acid acceptors used in compounding the chlorosulphanated polyethylene may be one or more of the materials conventionally used to perform this function, for example magnesium oxide and litharge. Metal oxides act also as cross-linking agents.

The level of acid acceptor in the compound is preferably between 7 and 15, and particularly good belts have been made with this level at approximately 11 pphr.

In addition to the acid acceptor the polymer is compounded with conventional compounding ingredients at their usual levels, and a typical compound will thus include an antioxidant, accelerators, and a filler, and may also have an antiozonant.

The inextensible tensile member conventionally used in toothed belts is cords of glass fibre, although textile cords such as the aromatic polyamide known as "Kevlar" can be used. It is important that the tensile member has good adhesion to the body and that this adhesion should not break down at the high operating temperatures.

Preferably the inextensible tensile member is bonded to the body by an adhesive comprising a non-volatile isocyanate in a suitable organic solvent, for example xylene, trichloroethylene, toluene or a mixture of two or more of these.

The adhesive can be applied directly to the glass cord, or the cord can be pretreated, for example by coating it with a heat-resistant material, or by solutioning the cord in a conventional resin-formaldehyde latex bath.

The preferred adhesive utilises an organic solvent and is manufactured and sold by Hughson Chemicals, Lord Corporation under the name "Chemlok 402". Belt manufacture using the adhesive-coated cord may be carried out immediately after solvent evaporation, or the treated cord may be stored and used up to six months later without deterioration of the adhesive properties.

It is common practice to cover the teeth of power transmission belts with a protective jacket fabric, the preferred fabric being a woven nylon and a belt according to the invention preferably has such a jacket. The adhesive system between the jacket fabric and the body must again be able to withstand the high operating temperatures.

Preferably this adhesive comprises a mixture of a rubber solution and a phenolic resin. The rubber solution is conveniently a solution of the compound used for the belt body, either alone or in admixture with a further solution, for example derived from a blend of epichlorohydrin and nitrile rubber.

Embodiments of the invention will now be described by way of example only.

EXAMPLE 1

A transmission belt in accordance with the present invention was made up from the following component in accordance with the manufacturing method described in British Pat. No. 875,283 and U.S. Pat. Nos. 3,078,205 and 3,078,206.

1. Body Compound

The body compound A has the following composition:

| | A |
|---|---|
| Hypalon LD999 | 100.00 |
| N.B.C. — Nickel dibutyl dithio-carbamate (antioxidant) | 3.00 |
| Maglite 'D' — Magnesium oxide (acid acceptor) | 4.00 |
| Kenmix 'P' — 90 % litharge dispersion in oil (curing agent and acid acceptor) | 8.00 |
| N762 SRF Black | 40.00 |
| Tetrone 'A' — Tetramethyl thiuram hexasulphide (accelerator) | 0.60 |
| HVA '2' — m-phenylene dimaleimide (accelerator) | 0.60 |

Hypalon LD999 (made by Du Pont) is a chlorosulphonated polyethylene having a Mooney viscosity of 25 to 36 ML 1+4 at 100° C, a specific gravity of 1.18, a chlorine content of 35% and a sulphur content of 1%. Hypalon 40S having a Mooney viscosity of 40 to 50 at 100° C can also be used.

2. Tensile Member

Parallel glass cords of standard 95F or 96F cords solutioned in conventional manner with 15 to 20 parts by weight of a resin formaldehyde latex and then with 4 to 10 parts by weight of Chemlok 402.

3. Jacket

Woven nylon fabric 2421 with 6 oz./sq. yd. pick up of jacket adhesive as shown below.

4. Jacket Adhesive

The jacket adhesive compound B has the following composition:

| | |
|---|---|
| Cement C | 544.0 |
| Cement D | 62.5 |
| Cellobond H831 — a modified phenolic resin in powder form with 8 % hexamethylene tetramine added (bonding agent) | 15.0 |
| Methyl ethyl ketone (M.E.K) | 45.0 | and cements C and D have compositions as follows:

| Cement C | |
|---|---|
| Herclor 'H' | 70.00 |
| Breon 1001 | 30.00 |
| Dibasic lead phosphate (Diphos) | 5.00 |
| Dibasic lead phthalate (Dythal) | 7.00 |
| Nickel dibutyl dithiocarbamate (N.B.C.) | 0.80 |
| Nickel dimethyl dithiocarbamate | 1.50 |
| FEF Black | 25.00 |
| Ultrasil VN3 — hydrated silica | 10.00 |
| Ethylene thiourea (NA.22) | 1.50 |
| Silane A189 — a mercapto functional silane. | 0.10 |
| Methyl ethyl ketone | 453.00 |
| Total | 603.90 |

Herclor 'H' is an epichlorohydrin homopolymer with 38.4% chlorine, a specific gravity of 1.36 and a Mooney viscosity ML-4 of 45 to 55 at 100° C. Breon 1001 is an acrylonitrile/butadiene copolymer with 40% acrylonitrile, a specific gravity of 1.0 and a Mooney viscosity ML-4 of 95 at 100° C.

| Cement D | |
|---|---|
| Body compound A | 156.20 |
| Toluene | 469.00 |
| Total | 625.20 |

Tests were carried out to determine the adhesion between the various components of the belt. The adhesion of the jacket fabric to moulded test samples of body compound was tested by positioning one inch wide strips of adhesive-coated nylon on a flat plate and loading the rubber compound into a frame mould to coat areas of the nylon with a ¼ inch thick layer of rubber. The rubber was cured under 100 p.s.i surface pressure at a temperature of 153° C for 30 minutes. The adhesion was measured by a peel test and was found to be 45.7 Kg/cm. width, with failure occurring in the body compound. Adhesion of the treated glass cord to moulded test samples of body compound was measured by the 'H' test (ASTM D1871 — Method A) and the adhesion values were as follows:

| | Kg/cm |
|---|---|
| Natural (before ageing) | 21.4 |
| 48 hours at 150° C | 21.0 |
| 120 hours at 150° C | 22.0 |
| 168 hours at 150° C | 20.2 |

20 Kg/cm is considered to be the critical level for good performance, and it will be seen that this is met, even after extended exposure to a temperature of 150° C.

The belt made in accordance with the foregoing example was compared, before ageing, with a control consisting of a conventional neoprene belt, with the following results:

| | Example | Control |
|---|---|---|
| Tensile Strength (Kg./Whole ¾" Belt) | 1902 | 1800 |
| Jacket adhesion (Kg./¾" wide Belt) | 25.5 | 22.0 |
| Tooth Shear (Kg./Tooth) | 305 | 255 |
| Compound Hardness (Shore A) | 60 | 70 |

The belt made as described in the Example has run continually in excess of 500 hours at temperatures controlled between 118° C and 121° C.

Tensile strength was measured by mounting the belt, with the teeth facing outwards, around two 100 mm. diameter cylinders and pulling the cylinders away from one another at 2.5 mm/min until the belt failed. Jacket adhesion was measured by cutting a length of the jacket and tooth structure from the belt body along the tooth root line, gripping the separated body section and tooth section in the upper and lower grips respectively of a tensile testing machine and moving the lower grip downwardly at a speed of 50 mm/min. Maximum load as the jacket is torn down over each of three successive teeth was measured and the lowest of these three maxima was taken as the jacket adhesion. Tooth shear was measured by clamping a section of the belt between a flat plate and a plate profiled to fit over a single tooth, holding the clamp and applying a downward load to the belt at a rate of 25 mm/min. The measurement shows the load required to shear the tooth.

We claim:

1. A toothed power transmission belt comprising a body with transversely extending teeth along at least one of its faces and an inextensible tensile member embedded in said body, said body being made from a chlorosulphonated polyethylene compounded with not more than 15 parts by weight of acid acceptor per 100 parts by weight of chlorosulphonated polyethylene.

2. A toothed power transmission belt as claimed in claim 1 wherein said acid acceptor is selected from metal oxides and litharge.

3. A toothed power transmission belt as claimed in claim 2 wherein said acid acceptor is magnesium oxide.

4. A toothed power transmission belt as claimed in claim 1 wherein the level of said acid acceptor is from 7 to 15 parts by weight.

5. A toothed power transmission belt as claimed in claim 4 wherein level of said acid acceptor is approximately 11 parts by weight.

6. A toothed power transmission belt as claimed in claim 1 wherein said inextensible tensile member is bonded to said body by an adhesive comprising a non-volatile isocyanate in an organic solvent.

7. A toothed power transmission belt as claimed in claim 6 wherein said organic solvent is selected from xylene, trichloroethylene, toluene and mixtures of said materials.

8. A toothed power transmission belt as claimed in claim 6 wherein said inextensible tensile member is treated with a resin-formaldehyde latex before application of said adhesive.

9. A toothed power transmission belt as claimed in claim 1 wherein said teeth of said belt are covered by a protective jacket fabric bonded to said body by an adhesive comprising a mixture of a rubber solution and a phenolic resin.

10. A toothed power transmission belt as claimed in claim 9 wherein said rubber solution comprises a solution of the compound used for said belt body.

11. A toothed power transmission belt as claimed in claim 9 wherein said rubber solution comprises a solution of the compound used for said belt body and of a blend of epichlorohydrin and nitrile rubber.

12. A toothed power transmission belt as claimed in claim 1 including means for securing the tensile member to the body.

13. A toothed power transmission belt as claimed in claim 1 including means for adhesively securing the tensile member to the body.

* * * * *